Jan. 20, 1953 L. W. McALPINE 2,626,021
HYDRAULIC LINK IN BRAKE MECHANISM
Filed Aug. 29, 1947 2 SHEETS—SHEET 1
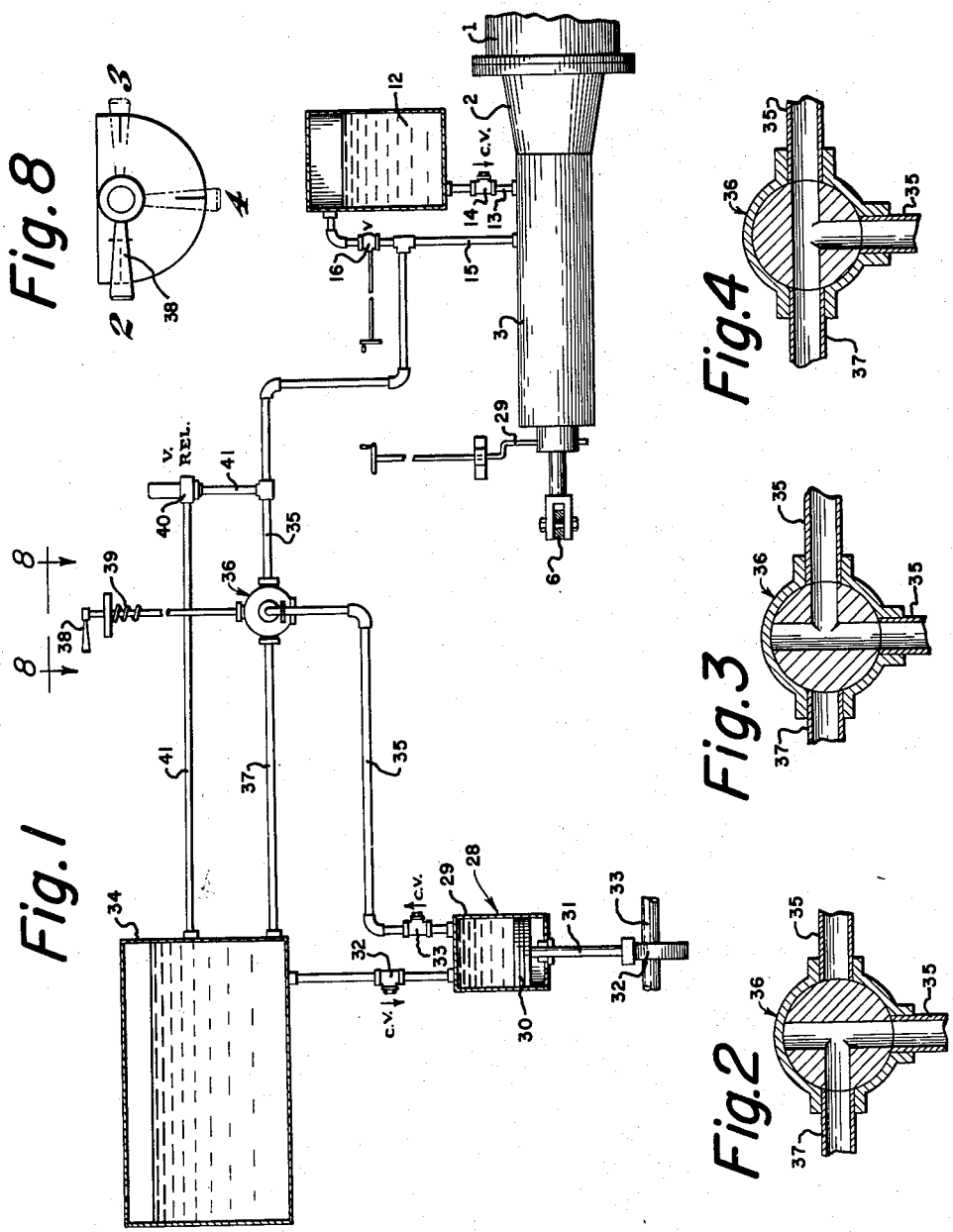
INVENTOR.
Lawrence W. McAlpine
BY
Mason, Fenwick & Lawrence
Attorneys Jan. 20, 1953 L. W. McALPINE 2,626,021
HYDRAULIC LINK IN BRAKE MECHANISM
Filed Aug. 29, 1947 2 SHEETS—SHEET 2
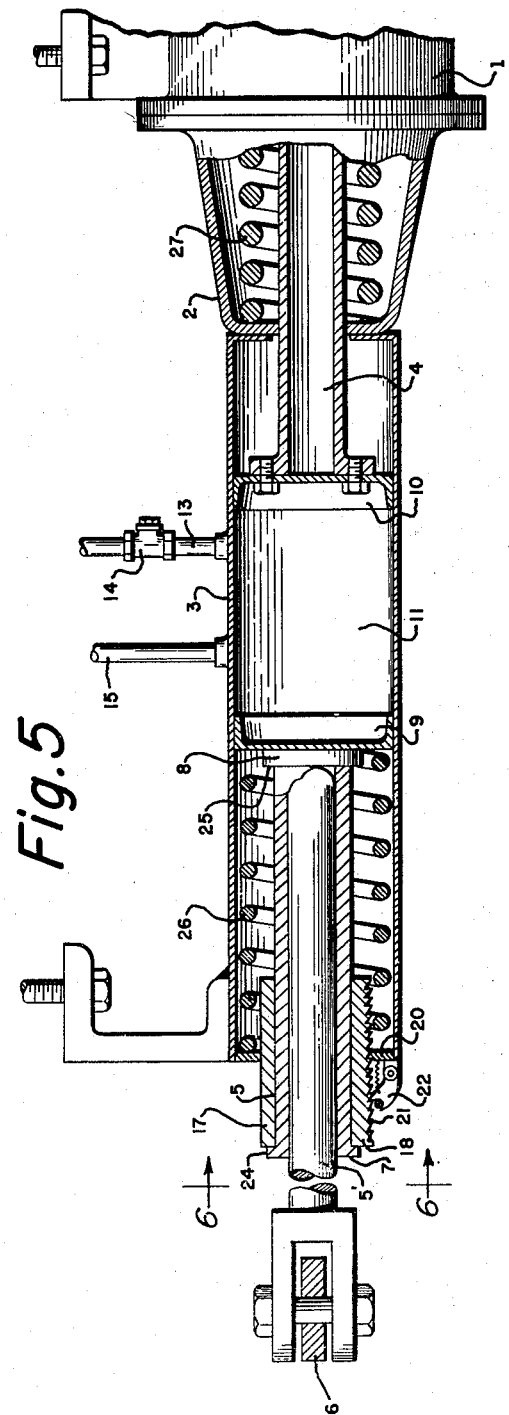
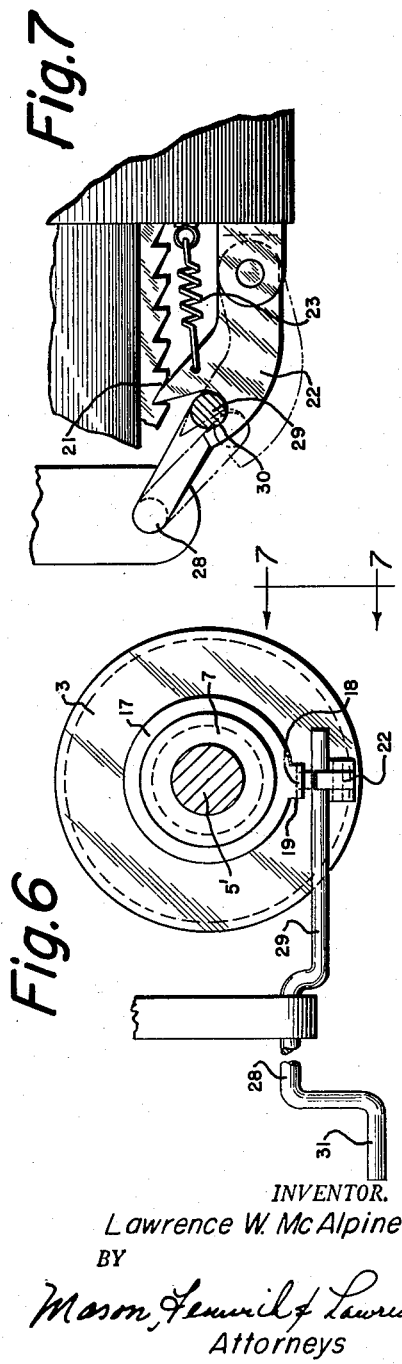
INVENTOR.
Lawrence W. McAlpine
BY
Mason, Fenwick & Lawrence
Attorneys Patented Jan. 20, 1953

2,626,021

UNITED STATES PATENT OFFICE 2,626,021

HYDRAULIC LINK IN BRAKE MECHANISM

Lawrence W. McAlpine, Savannah, Ga., assignor of one-half to Louis A. McAlpine, Portsmouth, Va.

Application August 29, 1947, Serial No. 771,251

3 Claims. (Cl. 188—198)

This invention relates to a hydraulic system, adjunctive to the conventional air brake system, in railway rolling stock, for automatically taking up slack in the brake rigging and for supplanting pneumatic pressure in applying the brakes when the car is detached from the main air line of the train.

One of the objects of the invention is to provide in an air brake system embodying a brake lever operating push rod provided with slack take-up means, a confined body of liquid interposed between the air cylinder piston rod and said push rod, forming a link in the line of force transmission when the brake is being pneumatically applied, and means for augmenting the volume of said liquid body upon the release movement, to compensate for the differential range limits of the return movement of the push rod and piston rod, whereby the working stroke of the air cylinder piston never exceeds its normal length by more than the distance of a single step of the slack take-up adjustment. This assures that the braking effort of the air cylinder piston will at all times be substantially uniform, and that in a train, the air cylinder pistons will operate with substantially uniform length of stroke so that substantially uniform pressure will be applied to the brakes of all the cars.

Another object of the invention is the provision of a braking system as described, in which the confined body of liquid is part of a hydraulic system which includes a pump carried by the car and operable through the movement of the car, so that when the car is detached from the train and air may not be available for operating the air cylinder piston, the volume of the body of liquid between the push rod and piston may be augmented by the pump, imparting pump pressure to the push rod and applying the brakes of the car solely hydraulically.

A further object of the invention is to provide a safeguard against the car pump building up braking pressure or pressure in excess thereof between the piston rod and push rod when the car is in the train with its air cylinder connected to the main air line.

Other objects of the invention will appear as the following description of a practical embodiment thereof proceeds.

In the drawings, throughout the several figures of which the same reference characters have been used to denote identical parts:

Figure 1 is a longitudinal side view, partly in section, and largely schematic of a braking system embodying the principles of the invention, the brake rigging not being shown, since it is conventional;

Figures 2, 3 and 4 are sectional views in a plane perpendicular to the axis of the valve body, showing respectively, three alternative positions of the hydraulic control valve;

Figure 5 is a side sectional view showing the juxtaposed piston rod of the air cylinder and push rod of the brake beam with slack take-up means, operatively disposed within a hydraulic cylinder;

Figure 6 is a cross-section taken along the line 6—6 of Figure 5;

Figure 7 is a fragmentary detail view of the slack take-up release means taken along the line 7—7 of Figure 6;

Figure 8 is a plan view of the hydraulic control valve casing and operating handle, taken along the line 8—8 of Figure 1, the handle being shown in alternative positions corresponding to valve positions illustrated respectively in Figures 2, 3 and 4.

Referring now in detail to the several figures, and first adverting to Figure 5, a conventional air cylinder 1 is shown having a cupped head 2 and a hydraulic cylinder 3, secured thereto and coaxially of the air cylinder. Within the air cylinder but not shown, since it is conventional, is a piston having fixed thereto the piston rod 4, which extends into the hydraulic cylinder at one end.

A brake lever operating push rod 5 extends slidably into the opposite end of the hydraulic cylinder 3, being shown as it is conventionally constructed in two parts comprising a thrust bar 5' freely surrounded by a sleeve 7, having a closed head 8 at its inner end, against which the thrust bar 5' abuts. The thrust bar 5' is connected to the live brake lever 6, which forms part of the conventional brake rigging associated with the wheels of the car. Insofar as the present invention is concerned, the thrust bar 5' and sleeve 7 may as well be a single integral element. The piston rod 4 and the sleeve 7 have the confronting spaced hydraulic pistons 9 and 10 secured thereto at their adjacent ends. The space within the hydraulic cylinder 3 between the pistons 9 and 10 is filled with a confined body 11 of liquid, which normally acts as a rigid link in the line of force transmission between the pneumatic piston in the cylinder 1, and the push rod 5, so that when air pressure is admitted to the cylinder 1 to set the brakes, the piston rod 4, body of liquid 11, sleeve 7 and thrust bar 5' act as a single rigid member in applying braking pressure to the brake lever 6.

Figure 1 shows that the space between the pistons 9 and 10 is in communication with a make-up reservoir 12 of liquid not under pressure, through an inlet pipe 13 controlled by a downwardly openings check valve 14, and an outlet pipe 15, normally closed by a cut-off valve 16, the function of which pipes will presently appear.

The push rod 5 is provided with slack take-up mechanism, the purpose of which is to progressively, by small steps, move the push rod toward the brake lever 6 as the brake shoes wear. It is well understood that in released position, worn brake shoes stand at a greater distance from the wheels than brake shoes that are not worn, so that in a train, it takes longer to apply the brakes in the case of worn brake shoes than with respect to intact brake shoes, and the object of the slack take-up mechanism is to compensate for wear, maintaining the worn brake shoes at a distance from the wheels substantially uniform with the distance of unworn brake shoes. It will be understood, referring to Figure 5, that in all positions of the sleeve 7 the thrust bar 5' will be biased into contact with the head 3 by the weight of the brake shoes, which when released, drop away from the wheels by gravity, moving the brake lever 6 and thrust bar 5' to the right, as viewed in Figure 5.

The sleeve 7 is surrounded, near its outer end, by a bushing 17, slidable thereupon and having an integral longitudinal feather 18 on its lower side, which plays in a recess 19 formed in the lower part of the head 20 of the hydraulic cylinder, preventing rotation of said bushing, but leaving it free to slide. The under side of the feather 18 is provided with ratchet teeth 21. A pawl 22 pivotally mounted on the hydraulic cylinder engages the ratchet teeth 21, being biased toward said teeth by the spring 23.

The bushing 17 is between stops constituted by a flange 24 at the outer end of the sleeve 7 and a flange 25 on the head 8. The flange 24 limits the rightward or release movement of the push rod 5, while the flange 25 strikes the adjacent end of the bushing 17 and moves said bushing in an outward direction against the yielding pressure of the pawl 22, when the air brake is applied. When the magnitude of the outward movement of the bushing 17 exceeds one of the steps represented by the pitch of the teeth 21, the pawl falls into an adjacent tooth and holds the bushing 17 permanently in a new position, one step further in a leftward direction.

Upon release of the braking pressure a spring 26 housed within the hydraulic cylinder behind the piston 9 returns the sleeve 7 until its outer flange 24 engages the adjacent end of the bushing 17. When pressure is released, a spring 27 housed within the cupped head 2 of the air cylinder 1 returns the pneumatic piston to its extreme rightward position in the cylinder 1.

Now, assuming that the space 11 between the hydraulic pistons is filled with liquid, and the brake is applied by pneumatic pressure developed in the cylinder 1, the hydraulic pistons 9 and 10 move as a unit to the left, transmitting the pneumatic pressure which sets the brake.

The length of the bushing 17 is such that when the outer end of the sleeve 7 is resting against it, the distance of the inner end of the bushing from the flange 25 represents substantially the length of the normal working stroke of the air piston of the cylinder 1. Now assuming that the brake shoes are unworn, when the brakes are applied pneumatically, the hydraulic pistons 9 and 10 move as a unit through the normal stroke of the air piston, setting the brakes before the flange 25 engages the bushing 17. After a period of use when the brake shoes have begun to have perceptible wear, the air piston will move out a little further than its normal working stroke in setting the brakes, so that the flange 25 contacts the bushing 17 and pushes it a little toward the left, but not enough to shift the pawl 22 into engagement with the next tooth. Upon release of the brakes, the springs 26 and 27 return the hydraulic pistons back to their original position, keeping the body of liquid 11 fully confined.

When the wear of the brake shoes reaches an extent at which the braking movement of the air piston causes the pawl 22 to engage another tooth, the bushing 17 becomes fixed in this new position so that upon release of the pneumatic pressure within the cylinder 1, inward movement of the sleeve 7 is limited by the new position of the bushing 17, so that the hydraulic piston 9 cannot move inward as far as formerly. But the pneumatic piston 10 moves to its former position under the urge of the springs 27, the result being that the piston 10 recedes from the piston 9, enlarging the volume of the chamber between said pistons so that the liquid body within said chamber no longer fills it, a void being created which is filled by make-up liquid flowing gravitationally from the reservoir 12 past the check valve 14.

Now when the chamber between the hydraulic pistons is thus filled through the addition of the make-up liquid, the distance between the hydraulic pistons is fixed, and greater than it was before, and the length of the line of force transmission from the air piston to the brake lever 6 is increased by an amount equal to the pitch of the tooth 21, so that the working stroke of the air piston is restored to its normal length. Thus the length of stroke of the air piston can never exceed its normal length by more than the pitch of one tooth. This means that the pneumatic braking effort will always be substantially uniform and substantially the same for all cars in the train.

At times it may be necessary to fully release the brakes, for example, in order to renew the brake shoes. To effect full release, means are provided for tripping the pawl 22, comprising a rod 28, extending transversely beneath the car to the side thereof, having a crank end 29 engageable in a slot 30 in the pawl 22 and having a crank handle 31 at its outer end. Correlated with the pawl tripping means is the cut-off valve 16. This is opened either prior to or subsequent to the tripping of the pawl 22, permitting the spring 26 to push the sleeve unrestrictedly to the right, displacing liquid from the chamber between said pistons through the pipe 15 past the open cut-off valve 16 into the reservoir 12. This permits the brake lever 6 and push rod 5 to yield to weight of the brake shoes until the latter hang at maximum distance from the wheels.

When the car is detached from the train and coasting under its own momentum, the compressed air in the conventional auxiliary reservoir, not shown, which supplies the air cylinder 1, cannot be relied upon for setting the brakes pneumatically, for there is no way of replenishing the pressure in said reservoir, and one never knows to what extent the pressure may have become depleted prior to the occasion for setting the brakes. Customarily an auxiliary hand brake is provided. The subject invention provides means by which the hydraulic system supplants the pneumatic brake operation when the car is disconnected from the main air line, through hydraulic pressure preferably derived from movement of the car itself.

Figure 1 shows a hydraulic pump 28, comprising a cylinder 29, having a piston 30, piston rod 31, and the oppositely opening inlet and discharge valves 32 and 33. The piston rod is reciprocated by a cam 32 on the car axle 33. Therefore, the pump operates whenever the car is in motion. The pump is supplied with liquid from a reservoir 34, which is not under pressure.

The pump 28 communicates with the hydraulic cylinder 3, by way of a pipe 35, which connects into the pipe 15 below the cut-off valve 16. The pipe 35 is controlled by a manually operated three-way valve 36, which has the three positions illustrated in Figures 2, 3 and 4. The position shown in Figure 2 is the one to which the valve is turned to pass liquid under pressure to the hydraulic cylinder 3. This pressure acts against hydraulic piston 10 as an abutment, to push hydraulic piston 9 to the left, setting the brakes. When the car has come to a stand-still, the pump 28 stops operating and the brakes remain set until released. To release the brakes the control valve 36 is turned to the position shown in Figure 4, in which a through passage is provided from the hydraulic cylinder 3 to the reservoir 34, by way of a pipe 35 and a pipe 37 communicating between said control valve and the reservoir, the liquid being displaced from the hydraulic cylinder 3 by the return of the hydraulic piston 9, under the urge of the spring 26.

It is obvious that when the car is connected in the train, the pump 30 will continuously operate, so that means must be provided to prevent the pump building pressure in the hydraulic cylinder 3 that would first set the brakes, and then continue to build up to bursting pressure. Such an eventuality is prevented by by-passing the discharge from the pump, back to the reservoir 34, through the pipes 35 and 37, by placing the control valve in the position shown in Figure 2. The handle of the control valve is biased by the spring 39, so that it will automatically throw the valve from Figure 3 or Figure 4 positions, to Figure 2 position, when the handle is released.

As an additional safeguard against the building up of excessive pressure in the hydraulic cylinder 3, a relief valve 40 is provided in a pipe 41, which communicates between the hydraulic cylinder 3 and the reservoir 34, by-passing the control valve, set to open at a pressure somewhat higher than maximum braking pressure.

While I have in the above description disclosed what I believe to be a practical embodiment of the invention, it will be understood by those skilled in the art that the specific details of construction and arrangement of parts, as described and illustrated, are by way of example and not to be construed as limiting the scope of the invention.

What I claim as my invention is:

1. In a braking system for railway rolling stock, a compressed air actuated piston normally operated by air at definite pressure, a piston rod connected thereto for applying braking pressure, and mechanical brake rigging and a push rod connected thereto receiving braking force from said piston rod, said piston rod and push rod being axially aligned the adjacent ends of said piston rod and push rod being spaced, hydraulic pistons carried by the ends of each, a hydraulic cylinder within which said hydraulic pistons reciprocate, said pistons constituting the only expansible walls of said cylinder the cylinder space between said hydraulic pistons being filled with liquid through which the braking pressure is transmitted, spring means returning said piston rod and push rod independently to their repose positions when released from the bias of the braking pressure, slack take-up means for progressively and periodically and step by step increasing the length of the space in said hydraulic cylinder between said hydraulic pistons with consequent increase in its volume upon return strokes of said piston rod and push rod, compensating for predetermined increments of lost motion in said brake rigging due to wear, and means for supplying make-up liquid to fill said hydraulic cylinder upon increase in its volume and for retaining it filled and its volume constant on the brake applying strokes of said piston rod, so that the working stroke of said compressed air piston never exceeds its minimum stroke by more than the length of a step of adjustment of said slack take-up means.

2. In a braking system for railway rolling stock, a compressed air actuated piston normally operated by air at definite pressure, a piston rod connected thereto for applying braking pressure, and mechanical brake rigging and a push rod connected thereto receiving braking force from said piston rod, said piston rod and push rod being axially aligned the adjacent ends of said piston rod and push rod being spaced, hydraulic pistons carried by the ends of each, a hydraulic cylinder within which said hydraulic pistons reciprocate, said pistons constituting the only expansible walls of said cylinder the cylinder space between said hydraulic pistons being filled with liquid through which the braking pressure is transmitted, spring means returning said piston rod and push rod independently to their repose positions when released from the bias of the braking pressure, slack take-up means for said push rod displacing the inward limit of its range of reciprocation, progressively step by step in a direction to increase the distance between said hydraulic pistons periodically on the release movement of said piston rod and push rod, with consequent increase in the volume of said cylinder, and means for supplying make-up liquid to fill said hydraulic cylinder upon increase in its volume and for retaining it filled on the brake applying stroke of said push rod so that the working stroke of said compressed air piston never exceeds its minimum stroke by more than the length of a displacement step of said slack take-up means.

3. In a braking system for railway rolling stock a compressed air actuated piston and piston rod for applying braking pressure, and mechanical brake rigging and a push rod connected thereto receiving braking force from said piston rod, the adjacent ends of said piston rod and push rod being spaced, hydraulic pistons carried by the ends of each, a hydraulic cylinder within which said hydraulic pistons reciprocate, the cylinder space between said hydraulic pistons being filled with liquid through which the braking pressure is transmitted, spring means returning said piston rod and push rod independently to their repose positions when released from the bias of the braking pressure, slack take-up means for said push rod displacing the inward limit of its range of reciprocation, progressively step by step in a direction to increase the distance between said hydraulic pistons periodically on the release movement of said piston rod and push rod, a reservoir of liquid above said hydraulic cylinder and an inlet and outlet from said reservoir to said cylinder between said hydraulic pistons, opposite opening check valves in said inlet and outlet permitting filling of said cylinder upon increase in its volume during its release stroke and retaining it filled and its volume constant on the brake applying stroke, so that the working stroke of said compressed air piston never exceeds its minimum stroke by more than the length of a displacement step of said slack take-up means.

LAWRENCE W. McALPINE.

REFERENCES CITED

The following references are of record in the file of this patent:

UNITED STATES PATENTS

| Number | Name | Date |
|---|---|---|
| Re. 18,723 | Hirschler | Jan. 31, 1933 |
| 615,141 | Clark | Nov. 29, 1898 |
| 635,988 | Wands | Oct. 31, 1899 |
| 764,142 | McCleary | July 5, 1904 |
| 996,284 | Schenck | June 27, 1911 |
| 1,023,790 | Acker | Apr 23, 1912 |
| 1,444,460 | Haskel | Feb. 6, 1923 |
| 1,479,700 | Djurson | Jan. 1, 1924 |
| 1,673,528 | Pigeolet | June 12, 1928 |
| 1,795,299 | Eddy | Mar. 10, 1931 |
| 1,947,405 | Camp | Feb. 13, 1934 |

FOREIGN PATENTS

| Number | Country | Date |
|---|---|---|
| 3,259 | Great Britain | Aug. 9, 1880 |